United States Patent
Berthelsen et al.

(10) Patent No.: US 8,887,896 B1
(45) Date of Patent: Nov. 18, 2014

(54) LIQUID TIGHT RECIPROCATING FLOOR CONSTRUCTION

(75) Inventors: Timothy M. Berthelsen, Tillamook, OR (US); Brady L. Byers, Tillamook, OR (US); Thomas Michael Price Almond, Newcastle (AU)

(73) Assignee: Hallco Industries Inc., Tillamook, OR (US)

( * ) Notice: Subject to any disclaimer, the term of this patent is extended or adjusted under 35 U.S.C. 154(b) by 1059 days.

(21) Appl. No.: 12/910,687

(22) Filed: Oct. 22, 2010

Related U.S. Application Data

(60) Provisional application No. 61/254,159, filed on Oct. 22, 2009.

(51) Int. Cl.
   *B65G 25/06* (2006.01)

(52) U.S. Cl.
   USPC ........................................................ 198/750.3

(58) Field of Classification Search
   None
   See application file for complete search history.

(56) References Cited

U.S. PATENT DOCUMENTS

| | | | |
|---|---|---|---|
| 3,269,072 A | 8/1966 | Black | |
| 4,091,743 A | 5/1978 | Lemon | |
| 4,611,708 A | 9/1986 | Foster | |
| 4,631,891 A | 12/1986 | Donavich | |
| 5,088,595 A | 2/1992 | Hallstorm | |
| 5,096,356 A | 3/1992 | Foster | |
| 5,139,133 A | 8/1992 | Foster | |
| 5,165,525 A | 11/1992 | Quaeck | |
| 5,222,590 A | 6/1993 | Quaeck | |
| 5,228,556 A | 7/1993 | Quaeck | |
| 5,238,360 A | 8/1993 | Foster | |
| 5,323,894 A | 6/1994 | Quaeck | |
| 5,346,056 A | 9/1994 | Quaeck | |
| RE35,156 E | 2/1996 | Hallstorm | |
| 5,547,067 A * | 8/1996 | Foster | ........................ 198/750.3 |
| 6,513,648 B1 | 2/2003 | Hallstorm et al. | |

OTHER PUBLICATIONS

Cargo Floor B.V.; "Cargo Floor: Assembly Instructions"; copyright 2006; 5 pages (2 title pages, p. 53, p. 54, and p. 105), www.cargofloor.nl.

* cited by examiner

*Primary Examiner* — Kavel Singh
(74) *Attorney, Agent, or Firm* — Law Office of Karen Dana Oster, LLC

(57) ABSTRACT

A liquid-tight reciprocating floor construction or system includes a plurality of longitudinal sub-deck sections having at least one longitudinal guide beam and at least one longitudinal valley. A first longitudinal side edge of one longitudinal sub-deck section is preferably in a mating relationship with an adjacent second longitudinal side edge of another longitudinal sub-deck section. An internal sealing structure is preferably positioned between adjacent first and second longitudinal side edges to form a longitudinal liquid-tight sub-deck joint therebetween.

20 Claims, 12 Drawing Sheets

LIQUID TIGHT RECIPROCATING FLOOR CONSTRUCTION

The present application is an application claiming the benefit of U.S. Provisional Patent Application Ser. No. 61/254,159, filed Oct. 22, 2009. The present application is based on and claims priority from this application, the disclosure of which is hereby expressly incorporated herein by reference in its entirety.

BACKGROUND OF INVENTION

The present invention is directed to a liquid-tight reciprocating floor construction or system, and more particularly a liquid-tight sub-deck of a reciprocating slat conveyor that may be positioned in a load-holding compartment.

Reciprocating slat-type conveyors (also referred to as "RSC," "reciprocating floors," "conveyor systems," "live floor conveyors," "reciprocating slat conveyors," or "conveyors") generally include a plurality of elongated slats (also referred to as "conveyor slats," "floor slats," or "deck slats"). The conveyors are generally used in the load-holding compartment of load transport vehicles (e.g. a mobile cargo trailer, bed of a truck (truck bed), rear portion of a semi-trailer, or container portion of a van-truck). Some conveyors are used in the non-mobile load-holding compartments (e.g. storage containers). The load-holding compartment has a front end toward the front of the compartment (e.g. in a truck, the front end would be the end toward the driver compartment) and a back or rear end (e.g. in a truck, the back end would be the end into which the load would be inserted and from which the load would be removed). The slats are arranged side-by-side to form the floor of the load-holding compartment so that they extend longitudinally to the framework of the load-holding compartment and parallel to the two longitudinal side walls of load-holding compartments.

Liquid-tight reciprocating slat conveyors, that can be defined as leak-proof, waterproof, and/or liquid-impervious reciprocating slat conveyors are not new.

U.S. Pat. No. 4,611,708 to Foster and entitled "Reciprocating Channel Floor Conveyor" (the Foster '708 reference), U.S. Pat. No. 5,238,360 to Foster and entitled "Reciprocating Floor Conveyor with Liquid Collecting Channels Between the Floor Members" (the Foster '360 reference), and U.S. Pat. No. 5,547,067 to Foster and entitled "Reciprocating Floor Conveyor with Liquid Collecting Base Structure" (the Foster '067 reference), all describe a reciprocating slat conveyor with moving slats separated by a large gap (space) supported by full-length guide beams with bottom members that are integral parts of extruded metal shapes joined together in an interlocking manner to form a liquid-tight sub-floor. The interlock is located near the top, slat-supporting surface of a guide beam and is described as a tongue-and-groove connection. Examples of this can be seen in FIG. 10 of the Foster '708 reference, FIG. 2 of the Foster '360 reference, and FIG. 1 of the Foster '067 reference.

U.S. Pat. No. 5,088,595 to Hallstrom and entitled "Waterproof Reciprocating Conveyor" (the Hallstrom '595 reference) and U.S. Pat. No. RE 35,156 to Hallstrom and entitled "Waterproof Reciprocating Conveyor" (the Hallstrom '156 reference) describe a reciprocating slat conveyor with a slat assembly in which a plurality of elongated, imperforate slat mounting bases are arranged side-by-side on a supporting framework with adjacent longitudinal edges of adjacent bases interconnected by a liquid-tight seal, thereby forming a liquid-tight base under a plurality of elongated, longitudinally reciprocative slats mounted thereon. The liquid-tight seal means is shown located near the bottom surface of the sub-floor underneath a slat in FIGS. 3 and 4 of the Hallstrom '595 reference and FIG. 5 of the Hallstrom '156 reference.

U.S. Pat. No. 5,165,525 to Quaeck and entitled "Liquid-Tight Reciprocating Floor Construction" (the Quaeck '525 reference), U.S. Pat. No. 5,228,556 to Quaeck and entitled "Liquid-Tight Reciprocating Floor Construction" (the Quaeck '556 reference), U.S. Pat. No. 5,323,894 to Quaeck and entitled "Reciprocating Floor Construction" (the Quaeck '894 reference), and U.S. Pat. No. 5,346,056 to Quaeck and entitled "Reciprocating Floor Construction" (the Quaeck '056 reference) describe reciprocating slat conveyors that include a plurality of slats slidable on a plurality of stationary liquid-tight bases, with each base supporting an individual slat. The unitary construction of the bases prevents liquid that leaks through the points of contact of each slat and each base from reaching the floor supporting the bases. The bases are interconnected, preferably by either mating flanges or a tongue-and-groove configuration on each base. Seals adjacent the mating flanges or the tongue-and-groove configuration prevent liquid from leaking through these points of attachment to the supporting floor. This seal and joint portion is located between two slats instead of underneath a slat as shown in FIGS. 2 and 3 of the Quaeck '525 reference, the Quaeck '556 reference, and the Quaeck '894 reference as well as in FIG. 3 of the Quaeck '056 reference.

U.S. Pat. No. 6,513,648 to Hallstrom and entitled "Reciprocating Conveyor with Top Front Drive" (the Hallstrom '648 reference) describes a reciprocating slat conveyor in which the elongated slats are supported at their lateral edges on V-shaped bearings that are mounted on Y-shaped supports integral with sub-deck sections on the container bottom and joined together with watertight seals. The joint is located near the bottom of the sub-deck sections underneath a slat, as shown in FIG. 5 of the Hallstrom '648 reference.

The Cargo Floor® leakproof floor described by Cargo Floor B.V. Coevorden of Holland in the Assembly Instructions found at www.cargofloor.nl (at least as early as 2006) includes sub-deck pieces that are assembled and joined at a joint between longitudinal side edges of adjacent longitudinal sub-deck sections. Each sub-deck section is shown as having a single valley between two raised edges. The edges are joined together so that the joints are at the top of a slat-support guide beam formed by the two edges of the adjacent longitudinal sub-deck sections. A bearing and slat cover the joint at the top of a slat-support guide beam.

BRIEF SUMMARY OF THE INVENTION

Described herein is a liquid-tight reciprocating floor construction or system.

Described herein is a liquid-tight sub-deck of a reciprocating slat conveyor system positioned in a load-holding compartment. The liquid-tight sub-deck preferably includes a plurality of longitudinal sub-deck sections, each longitudinal sub-deck section preferably having a first longitudinal side edge and a second longitudinal side edge, each longitudinal sub-deck section preferably including at least one longitudinal guide beam and at least one longitudinal valley. A first longitudinal side edge of one longitudinal sub-deck section is preferably in a mating relationship with an adjacent second longitudinal side edge of another longitudinal sub-deck section. An internal sealing structure is preferably positioned between adjacent first and second longitudinal side edges to form a longitudinal liquid-tight sub-deck joint therebetween.

Preferably the longitudinal liquid-tight sub-deck joints are rotationally-formed longitudinal liquid-tight sub-deck joints between adjacent longitudinal sub-deck sections.

One preferred longitudinal sub-deck section has a first longitudinal side edge having a longitudinal groove at least substantially spanning an internal longitudinal sidewall of a longitudinal guide beam and a second longitudinal side edge having a longitudinal protrusion structure, the longitudinal groove being in a mating relationship with the longitudinal protrusion. Internal sealing structure is preferably positioned between the longitudinal groove and the longitudinal protrusion.

One longitudinal sub-deck section has a second longitudinal side edge with a second interlocking structure and a motion limiter. A vertical depression feature is formed or defined between the second interlocking structure and the motion limiter. The first longitudinal side edge of an adjacent longitudinal sub-deck section is preferably positionable within the vertical depression feature so that the motion limiter prevents lateral movement of the first longitudinal side edge away from the second interlocking structure.

One preferred longitudinal sub-deck section has a second longitudinal side edge having a second interlocking structure and an extension and at least one fastener securing the extension to the load-holding compartment. The at least one fastener is positioned in a longitudinal channel under a longitudinal guide beam of an adjacent longitudinal sub-deck section. Preferably the longitudinal channel is sealed to prevent liquid from entering the longitudinal channel.

One preferred liquid-tight sub-deck is designed to be used with a reciprocating slat conveyor that includes a plurality of moving longitudinal slats, each moving slat-supported on a respective one of the longitudinal guide beams. Longitudinal bearings may be positioned longitudinally between (sandwiched) the longitudinal guide beams and the longitudinal slats.

Another preferred liquid-tight sub-deck includes at least two longitudinal sub-deck sections (a first longitudinal sub-deck section and an adjacent second longitudinal sub-deck section). Each longitudinal sub-deck section preferably has a first longitudinal side edge and a second longitudinal side edge. Each longitudinal sub-deck section preferably has at least one longitudinal guide beam and at least one longitudinal valley. A first longitudinal side edge of the first longitudinal sub-deck section preferably has a first interlocking structure associated with an internal longitudinal sidewall of one of its at least one longitudinal guide beams. A second longitudinal side edge of the second longitudinal sub-deck section preferably has a second interlocking structure. An internal sealing structure is preferably positioned between the first interlocking structure and the second interlocking structure when the first interlocking structure and the second interlocking structure are in a mating relationship, the internal sealing structure forming a longitudinal liquid-tight sub-deck joint therebetween.

Yet another preferred liquid-tight sub-deck of a reciprocating slat conveyor includes at least two longitudinal sub-deck sections (a first longitudinal sub-deck section and an adjacent second longitudinal sub-deck section). Each longitudinal sub-deck section preferably has a first longitudinal side edge and a second longitudinal side edge. Each longitudinal sub-deck section preferably includes at least one longitudinal guide beam and at least one longitudinal valley. A first longitudinal side edge of the first longitudinal sub-deck section preferably has a first interlocking structure at least substantially coextensive with an internal longitudinal sidewall of a longitudinal guide beam. A second longitudinal side edge of the second longitudinal sub-deck section preferably has a second interlocking structure, a motion limiter, and an extension. A vertical depression feature is formed or defined between the second interlocking structure and the motion limiter. Preferably the internal sealing structure is positioned between the first interlocking structure and the second interlocking structure when the first interlocking structure and the second interlocking structure are in a mating relationship, the internal sealing structure forming a longitudinal liquid-tight sub-deck joint therebetween. The first longitudinal side edge of the first longitudinal sub-deck section is preferably positionable within the vertical depression feature, the motion limiter preventing lateral movement of the first longitudinal side edge away from the second interlocking structure. Preferably at least one fastener is used to secure the extension to the load-holding compartment, the at least one fastener positioned in a longitudinal channel under a longitudinal guide beam of an adjacent longitudinal sub-deck section.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary liquid-tight reciprocating floor systems.

DETAILED DESCRIPTION OF THE INVENTION

Figure 1:
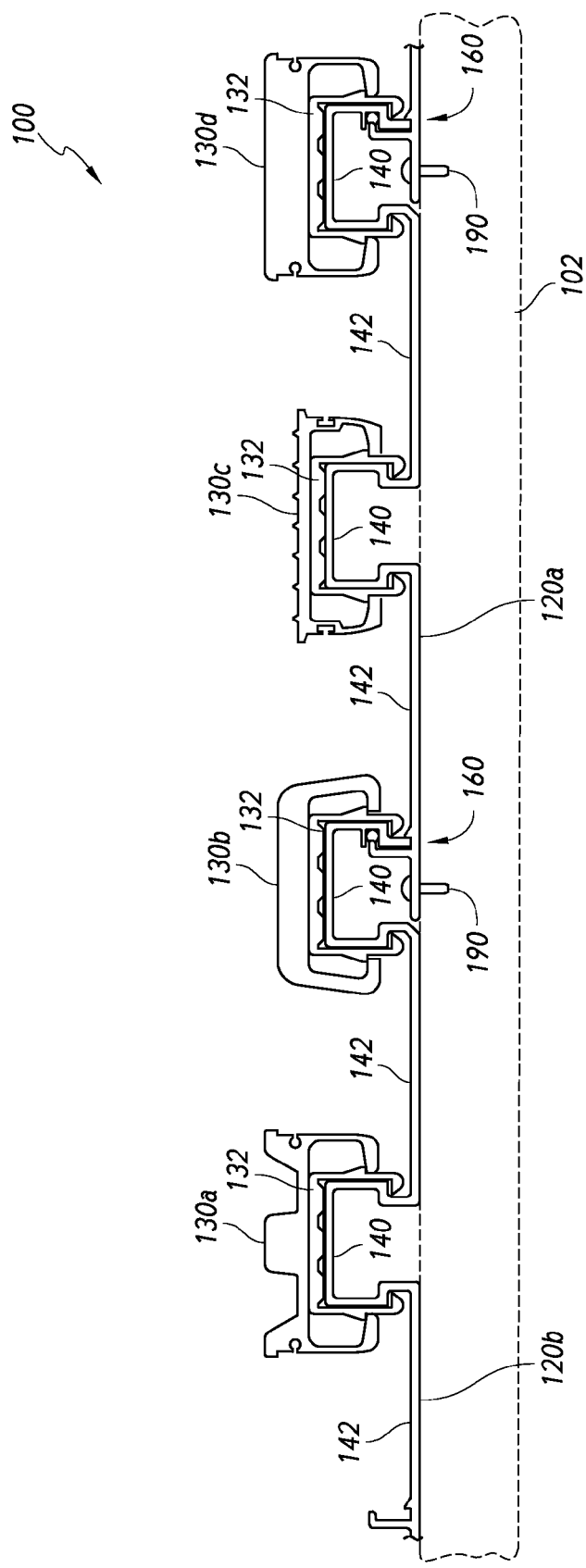
FIG. 1 is an end view of a preferred exemplary liquid-tight reciprocating floor system.

FIG. 1 shows an exemplary liquid-tight reciprocating floor construction or system 100. A liquid-tight reciprocating floor system 100 is being described as having at least two layers supported on framework 102 (e.g. cross members) of the load-holding compartment 104 (for example, of a vehicle 106 (FIG. 2) or a non-mobile load-holding compartment). The lower layer is a sub-floor or sub-deck (hereinafter referred to as a "sub-deck") made up of a plurality of sub-floor or sub-deck sections 120a, 120b (jointly referred to hereinafter as sub-deck sections 120). The upper layer is made up of a plurality of moving slats 130 (shown in FIG. 1 as exemplary slats 130a, 130b, 130c, and 130d). Optionally, bearings (shown as longitudinal bearings 132) can be stratified (layered or sandwiched) between the lower and upper level. One preferred reciprocating slat conveyor includes a liquid-tight sub-deck (shown as sub-deck sections 120 having longitudinal guide beams 140 and longitudinal valleys 142), hold-down bearings 132 that snap onto the guide beams 140, and moving slats 130 supported by the bearings 132 and guide beams 140.

Components

FIG. 1 shows an exemplary liquid-tight reciprocating floor system 100 positioned on the floor of a load-holding compartment 104 (FIG. 2) and at least substantially spanning (substantially coextensive with) the length thereof. The floor system 100 is shown as having two primary layers. The lower layer is a sub-deck made up of a plurality of sub-deck sections 120. The upper layer is made up of a plurality of moving slats 130. FIG. 1 shows exemplary slats 130 with several different slat profiles (130a, 130b, 130c, 130d).

Figure 2:
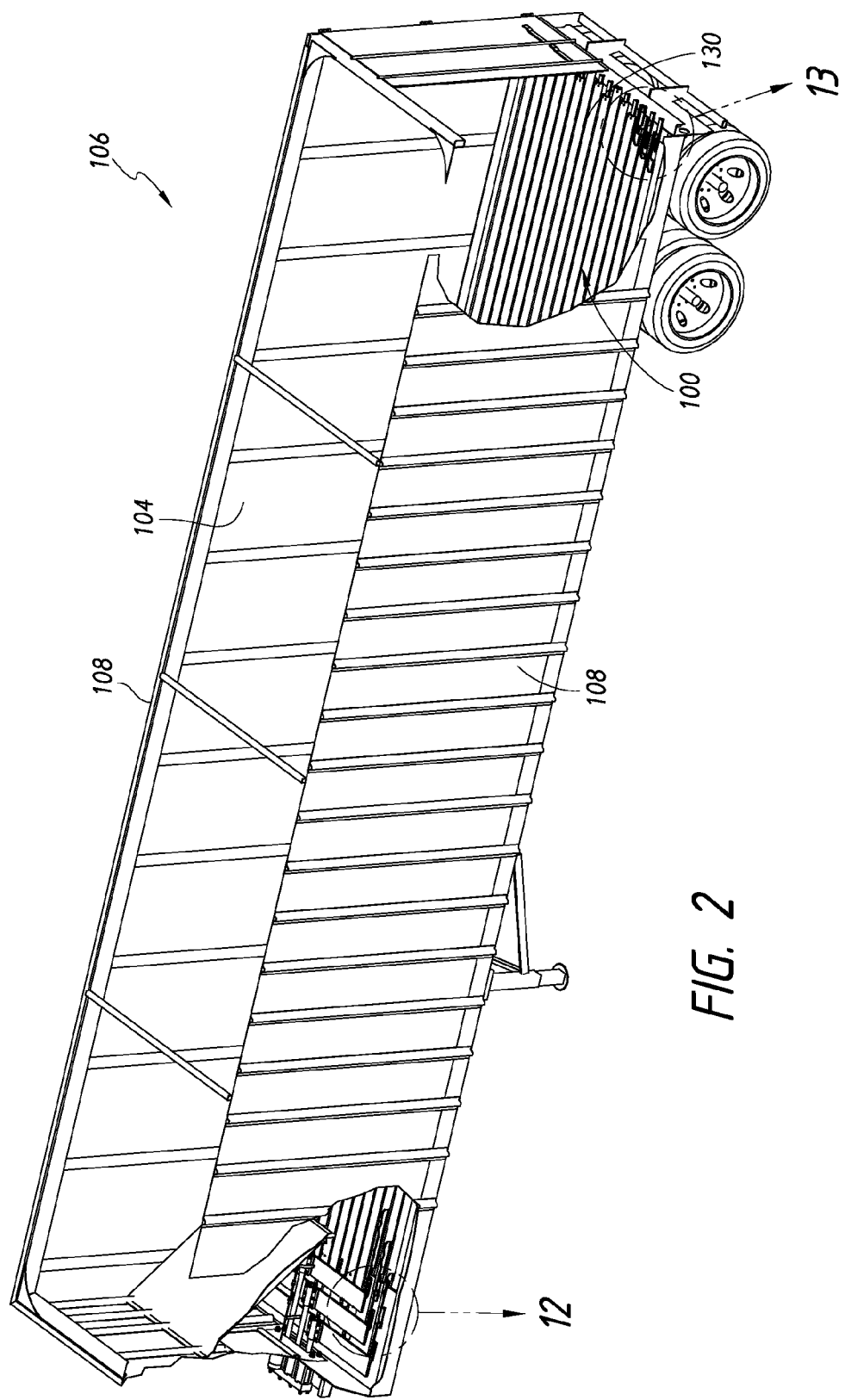
FIG. 2 is a perspective side view of a load-holding compartment in which a preferred exemplary liquid-tight reciprocating floor system is installed, a portion of the first front end and a portion of the second back end being cutaway to show the internal components thereof.
Figure 3:
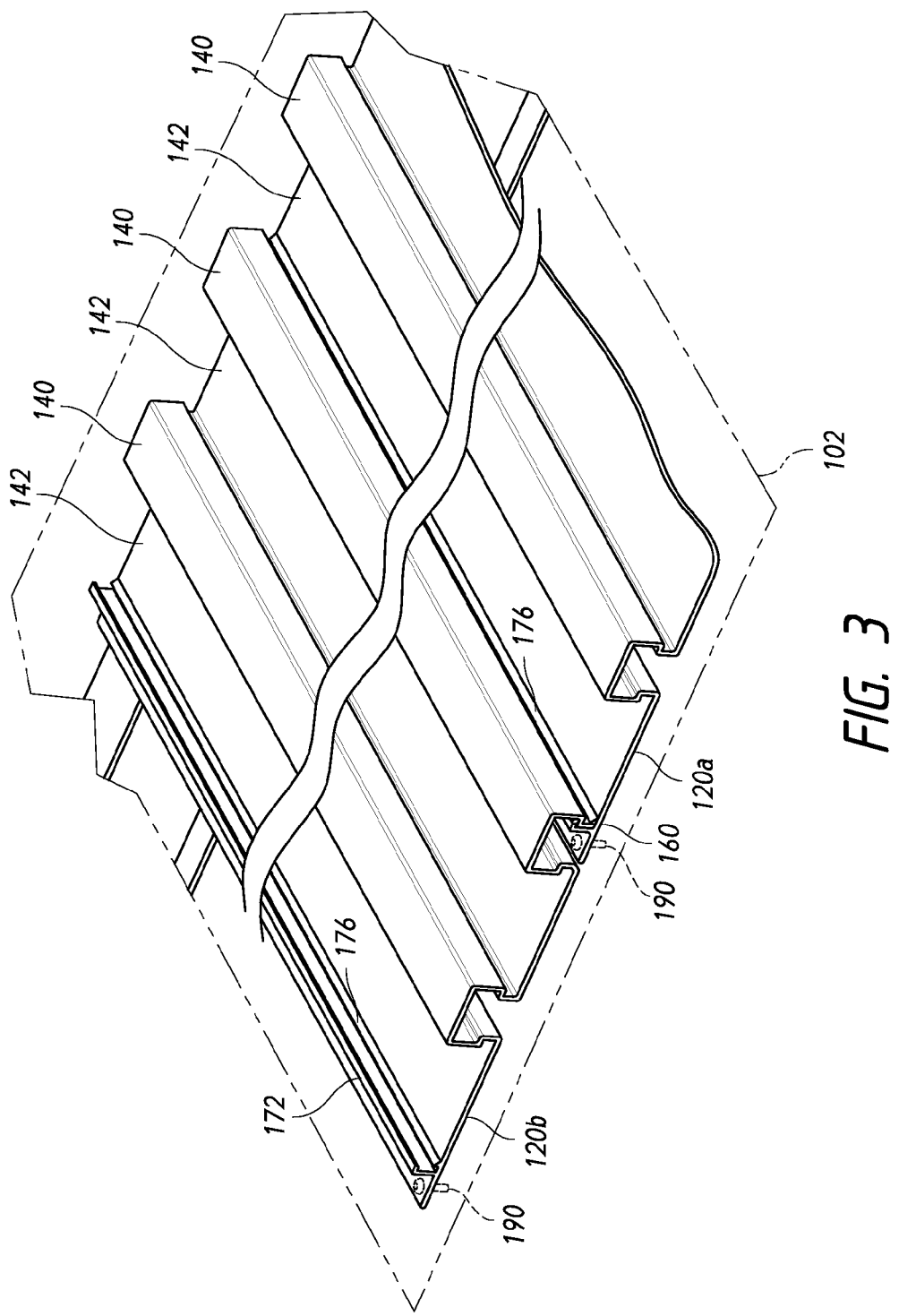
FIG. 3 is a perspective view of preferred exemplary sub-deck sections having longitudinal guide beams and longitudinal valleys.
Figure 4:
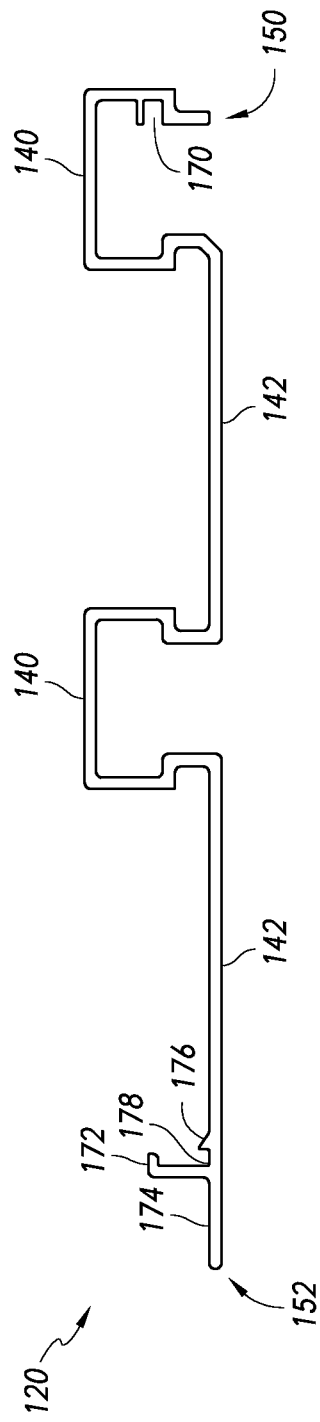
FIG. 4 is an end view of a preferred exemplary sub-deck section having two longitudinal guide beams and two longitudinal valleys.

As shown in FIG. 1, the sub-deck consists of longitudinal sub-deck sections 120, each sub-deck section 120 having alternating at least one longitudinal guide beams 140 (also referred to as "sub-deck guide beams," "slat-support guide beams" (because they are for supporting a slat 130), and "guide beams") and at least one longitudinal valley 142. Preferably the longitudinal guide beams 140 and longitudinal valleys 142 substantially span the length of the load-holding compartment 104 as shown in FIG. 2. As shown in FIGS. 1 and 3, the longitudinal guide beams 140 are raised in relation to the longitudinal valleys 142. It should be noted that "raised" is a term that is meant to be relative and, therefore, the longitudinal guide beams 140 are "raised" if they are above the adjacent longitudinal valleys 142. Although most of the figures, including FIG. 4, show the sub-deck sections 120 with two (2) guide beams 140 and two (2) longitudinal valleys 142, it should be noted that alternative sub-deck sections could have more or less guide beams 140 and/or longitudinal valleys 142. For example, FIG. 5 shows a preferred alternative sub-deck section 122 having one longitudinal guide beam 140 and one longitudinal valley 142.

Figure 5:
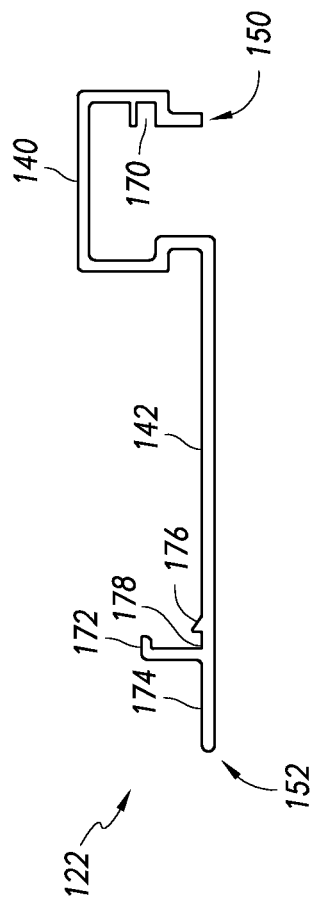
FIG. 5 is an end view of a preferred exemplary sub-deck section having one longitudinal guide beam and one longitudinal valley.

As shown in FIGS. 4 and 5, each sub-deck section 120 has a first longitudinal side edge 150 and a second longitudinal side edge 152. The first longitudinal side edge 150 of one sub-deck section 120 (for reference purposes, also discussed as sub-deck section 120b) is designed to meet with, engage with, and/or interlock with the second longitudinal side edge 152 of an adjacent sub-deck section 120 (for reference purposes, also discussed as sub-deck section 120b) to form a longitudinal sub-deck joint 160 therebetween (also referred to as the "rotationally-formed longitudinal liquid-tight sub-deck joints"). The phrases "meet with" (or meetable), "engage with" (or engageable), and "interlock with" (or interlockable) are meant to describe various mating (matable) relationships that the edges 150, 152 of adjacent sub-deck sections 120a, 120b may have. "Meet with" can be defined as substantially touching. "Engage with" can be defined as having a relationship beyond touching, such as overlapping. "Interlock with" can be defined as having a connection more substantial than "engaging with," including, but not limited to, friction fits, snap fits, and pressure fits. Interlocking may be permanent or temporary. The "meeting," "engaging," and "interlocking" relationships generally allow sliding therebetween, although there could be gradations such that the sliding could be more limited between interlocking edges than between meeting edges. The "meeting," "engaging," and "interlocking" relationships are referred to jointly as mating relationships. It should be noted that the "edges" may not be absolute edges, but relative edges (near the absolute edge as shown). For example, a second longitudinal side edge 152 could be said to include an interlocking structure 172, an extension 174, and perhaps a longitudinal guide or limiter ridge 176.

As shown in FIGS. 4 and 5, an exemplary preferred sub-deck section 120 has a first interlocking structure 170 at the first longitudinal side edge 150 positioned under the longitudinal guide beam 140 and a second interlocking structure 172 at the second longitudinal side edge 152 positioned substantially near the end of the longitudinal valley 142. The first interlocking structure 170 is shown as a longitudinal groove at least substantially spanning (substantially coextensive with) an internal longitudinal sidewall of the longitudinal guide beam 140. The longitudinal groove may have internal sealing structure 180 therein to enhance and/or create a seal between the adjacent sub-deck sections 120a, 120b. The sealing structure 180 is "internal" because it is internal to or within the sealed portion of the longitudinal guide beam 140 (in the longitudinal opening or channel under the longitudinal guide beam 140). The internal sealing structure 180 may be an O-ring cord, a rubber cord, caulking, packing, and/or other sealing means or combination of sealing means known or yet to be discovered that can create a liquid-tight barrier. Although the first interlocking structure 170 is "at" the first longitudinal side edge 150, it is shown as being relatively above the absolute edge. The second interlocking structure 172 is shown as a longitudinal protrusion structure (shown as a longitudinal upright member with a longitudinal protrusion or a longitudinal upside-down "L") at the second longitudinal side edge 152 positioned substantially near the end of the longitudinal valley 142. The shown longitudinal upside-down "L" second interlocking structure 172, when mated with the shown longitudinal groove first interlocking structure 170 prevents vertical motion between the sub-deck sections 120a, 120b. Although the second interlocking structure 172 is "at" the second longitudinal side edge 152, it is shown as being slightly distanced from the absolute edge. Preferred interlocking structures 170, 172 substantially span the length of their respective longitudinal side edges 150, 152. In alternative sub-deck sections, the interlocking structures 170, 172 may be other types of mating structures.

As shown in FIGS. 4 and 5, the second longitudinal side edge 152 of an exemplary preferred sub-deck section 120 may also include at least one extension 174 beyond the second interlocking structure 172, the extension 174 being suitable for use as a "sub-deck section to framework fastening mechanism." The at least one extension 174 may be a single longitudinal extension or several smaller extensions or tabs along the second longitudinal side edge 152. At least one fastener 190 may be used to attach the at least one extension 174 (and, therefore, the sub-deck section 120) to the supporting framework 102. The fastener 190 and the extension 174 are positioned under the sealed longitudinal guide beam 140 (in the longitudinal opening or channel under the longitudinal guide beam 140) so that it is outside of (remote from) the liquid retaining upper surfaces. The at least one fastener 190 is shown as a bolt, although alternative fasteners such as welds, rivets, nails, and/or other fastening means known or yet to be discovered could be used to secure the sub-deck sections 120 to the supporting framework 102.

Figure 6:
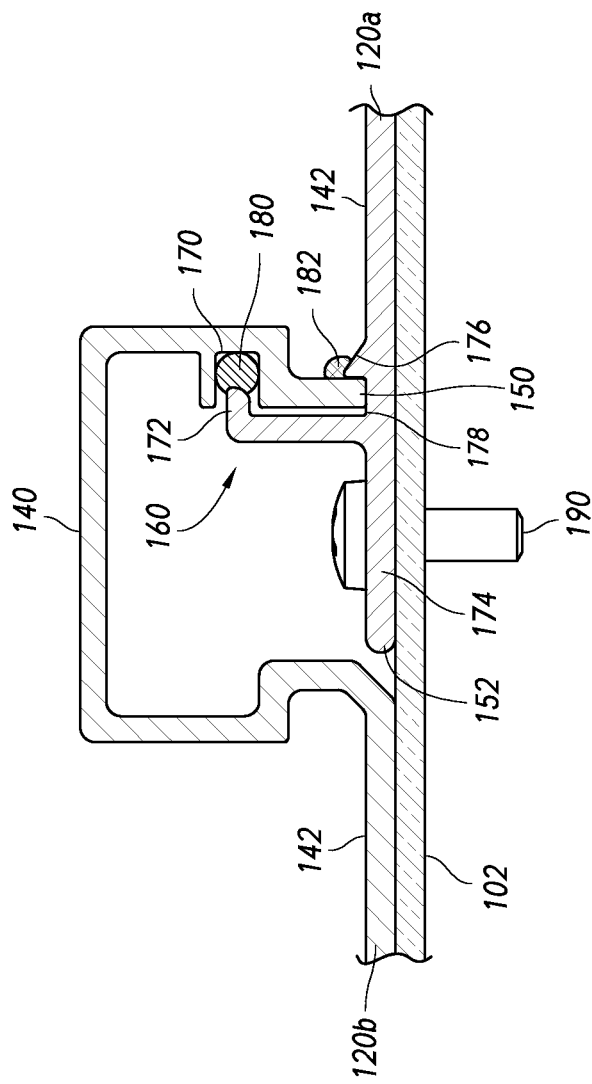
FIG. 6 is an enlarged cross-sectional view of a preferred exemplary longitudinal guide beam and a longitudinal sub-deck joint between adjacent sub-deck sections.

FIG. 6 is enlarged to show an exemplary sub-deck joint 160 formed by mating the first interlocking structure 170 (shown as a longitudinal sealing structure retaining groove at the first longitudinal side edge 150 of a first sub-deck section 120a) with the second interlocking structure 172 (shown as a longitudinal protrusion structure at the second longitudinal side edge 152 of a second sub-deck section 120b) and, preferably, having longitudinal internal sealing structure 180 therebetween. It should be noted that each sub-deck joint 160 can be self-restraining and self-tightening. The shown preferred sub-deck joint 160 is located in the interior surface of a longitudinal guide beam 140. FIG. 6 also shows a fastener 190 securing the extension 174 of the sub-deck section 120 to the supporting framework 102. The fastener 190 is positioned below (within the sealed longitudinal channel under) the longitudinal guide beams 140 (as shown) so that the fasteners 190 do not have to be sealed. This saves installation labor in that the fasteners 190 do not have to be sealed during installation and makes removal of the system 100 easier. Further, having the fasteners 190 under the sealed longitudinal guide beams 140 ensures that there will not be leaks from around the fasteners 190, something that is possible in known systems if the sealing around the fasteners is scraped off during the use and/or the sealing was incomplete (improper installation sealing).

As shown in FIGS. 3-6, exemplary preferred sub-deck sections 120 preferably have a guide or motion limiter (shown as longitudinal limiter ridge 176) that can be a ridge 176 substantially parallel to and relatively close (shown as no more than twice the thickness of the sub-deck section material) to the second interlocking structure 172. Although the limiter is shown as a longitudinal limiter ridge 176 at least substantially spanning (substantially coextensive with) the length of the sub-deck section 120, the limiter may alternatively have a different configuration (e.g. the limiter may be a groove in the surface adjacent the guide beam 140) or it may be a series of smaller limiters (ridges, bumps, or grooves). During installation, the first longitudinal side edge 150 of a sub-deck section 120 can be rested between the limiter ridge 176 and the longitudinal point 178 (FIG. 6) where the second interlocking structure 172 meets the valley 142. This resting area can be described as a longitudinal "vertical depression feature." When the first longitudinal side edge 150 is positioned within the longitudinal vertical depression feature (the longitudinal space between the longitudinal intersection point 178 and the limiter ridge 176), the limiter prevents lateral movement between adjacent sub-deck sections 120a, 120b both during positioning (thus helping to prevent the sub-deck section 120b from sliding laterally out of position away from the longitudinal intersection point 178) and once sub-deck section 120b is positioned and mated with the sub-deck section 120a.

FIG. 6 also shows an additional external sealing structure 182 that may be used to seal the outside of the longitudinal joint 160 either prior to assembly (e.g. using caulking) or after assembly (e.g. welding). In the shown joint, the external sealing structure 182 is positioned longitudinally along the intersection of the longitudinal limiter ridge 176 and the outside of the first longitudinal side edge 150 of the sub-deck section 120. The external sealing structure 182 may be caulking, welding, soldering, painting, taping, and/or other sealing means or combination of sealing means known or yet to be discovered that can create a liquid-tight barrier.

Figure 7:
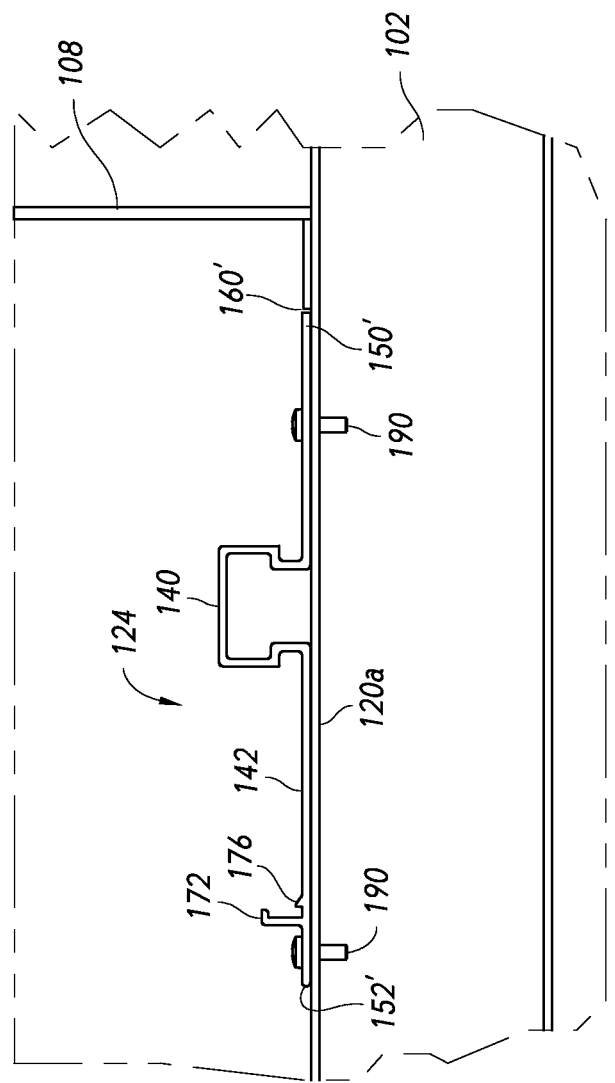
FIG. 7 is an end view of a preferred exemplary wall-adjacent longitudinal sub-deck section fastened to the supporting framework.

FIG. 7 shows an exemplary wall-adjacent longitudinal sub-deck section 124 that is a variation of a sub-deck section 120. The wall-adjacent longitudinal sub-deck section 124 is meant to be placed substantially adjacent a longitudinal side wall 108 of the load-holding compartment 104. Wall-adjacent longitudinal sub-deck sections 124 can be specially configured to mate with (having a mating relationship with) and/or form alternative longitudinal sub-deck joints 160' with standard longitudinal side walls 108 of a load-holding compartment 104. For example, the exemplary wall-adjacent longitudinal sub-deck section 124 in FIG. 7 is shown as having a specially configured first longitudinal side edge 150' for mating with its respective longitudinal side wall 108 and a second longitudinal side edge 152' (that is substantially identical to standard second longitudinal side edges 152) for mating with an adjacent standard first longitudinal side edge 150. Another exemplary wall-adjacent longitudinal sub-deck section 124 (not shown) can have a first longitudinal side edge 150' (that is substantially identical to standard first longitudinal side edges 150) for mating with an adjacent standard second longitudinal side edge 152 and a specially configured second longitudinal side edge 152' (not shown) for mating with its respective longitudinal side wall 108. The alternative longitudinal sub-deck joints 160' are shown as exaggerated gaps, but preferably the "gaps" would be minimized, there would be overlap, and/or a seal would be used to prevent leakage through the alternative longitudinal sub-deck joints 160'. As an alternative to the wall-adjacent longitudinal sub-deck section 124, adapter pieces (not shown) can be used that allow standard sub-deck sections 120 with standard first and second longitudinal side edges 150, 152 to mate with traditional longitudinal side walls 108 of load-holding compartments 104. Another alternative to handling the connection between wall-adjacent longitudinal sub-deck sections 124 and adjacent longitudinal side walls 108 is that the longitudinal side walls 108 can be specially configured to mate with standard sub-deck sections 120 with standard first and second longitudinal side edges 150, 152. Yet another alternative is manually adapting the longitudinal side edges to mate with traditional longitudinal side walls 108. Additional alternative possibilities include variations or combinations of the above examples or any means for mating or interconnecting the longitudinal side edges with respective longitudinal side walls 108.

The longitudinal sub-deck sections 120 can be formed, for example, by extruding material. Alternative sub-deck sections 120 can be made by molding, pultruding, machining, assembly of multiple components to form the required shape, or any other fabrication method known or yet to be discovered. Materials may include, for example, plastic, fiberglass, metal, composite material, ceramics, or any other material known or yet to be discovered.

Installation Method

Adjacent sub-deck sections 120 are joined together in a mating relationship at their longitudinal edges 150, 152 by longitudinal sub-deck joints 160. This can be accomplished in a multi-step process such as that shown in FIGS. 7-13. It should be noted that these steps are meant to be exemplary and some steps are not necessary for some installments.

FIG. 7 shows a first sub-deck section 120a (shown as a wall-adjacent longitudinal sub-deck section 124) fastened to the supporting framework 102. The fastening may be accomplished using fasteners 190. It should be noted that the sub-deck joint 160' can be a liquid-tight seal without any additional structure or there may be additional sealing structure (not shown) such as caulking, welding, and/or other sealing means or combination of sealing means known or yet to be discovered that can create a liquid-tight barrier between longitudinally adjacent sub-deck sections 120.

Figure 8:
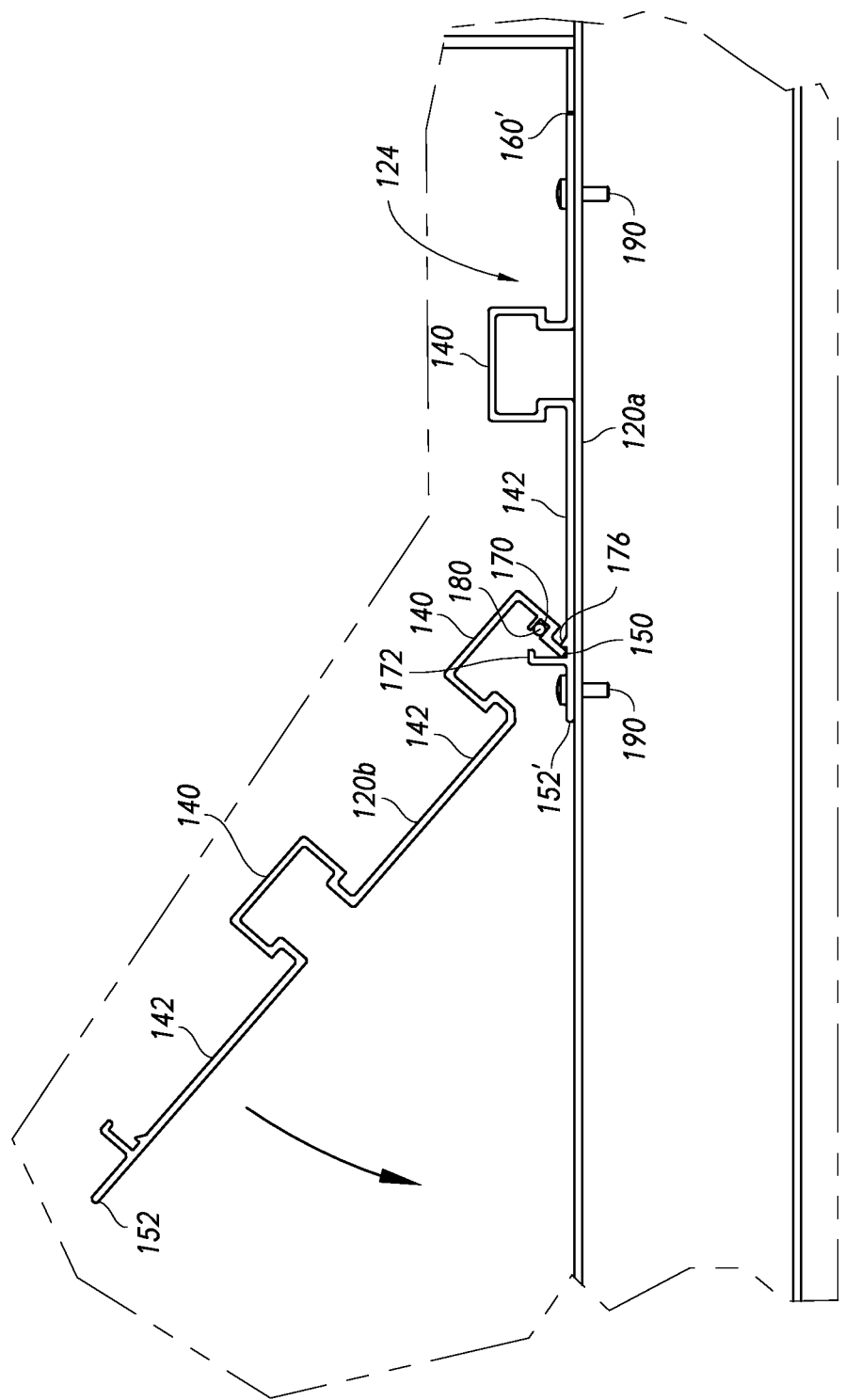
FIG. 8 is an end view of a preferred exemplary second sub-deck section positioned substantially longitudinally adjacent and at a fairly steep angle relative to the first sub-deck section (wall-adjacent longitudinal sub-deck section).

FIG. 8 shows a second sub-deck section 120b positioned substantially longitudinally adjacent the first sub-deck section 120a, with its first longitudinal side edge 150 overlapping the adjacent second longitudinal side edge 152, and the second sub-deck section 120b at a fairly steep angle (shown as 45 degrees, but can be between 15 and 90 degrees) in relation to the first sub-deck section 120a. The term "substantially longitudinally adjacent" is used to describe the fact that the two adjacent sub-deck sections 120a, 120b are substantially coextensive (so that their ends meet as shown in FIG. 3), but takes into consideration that if they are not exactly coextensive, the sub-deck section 102b can be repositioned by picking up or sliding the sub-deck section 102b.

FIG. 8 also shows the first longitudinal side edge 150 of the sub-deck section 120b resting between the limiter (shown as longitudinal limiter ridge 176) and the second interlocking structure 172 (at the intersection point 178). The limiter (shown as longitudinal limiter ridge 176) prevents the longitudinal side edge 150 of the sub-deck section 120b from moving laterally away from the longitudinal guide beam 140 and otherwise keeps the sub-deck section 120b properly positioned.

Finally, FIG. 8 shows internal sealing structure 180 (such as O-ring cord, rubber cord, caulking, and/or other sealing means or combination of sealing means known or yet to be discovered that can create a liquid-tight barrier between longitudinally adjacent sub-deck sections 120) already positioned within the first interlocking structure 170 (shown as a longitudinal groove) before the interlocking structures 170, 172 have mated. In practice, the internal sealing structure 180 would preferably be positioned within the first interlocking structure 170 prior to being positioned.

Figure 9:
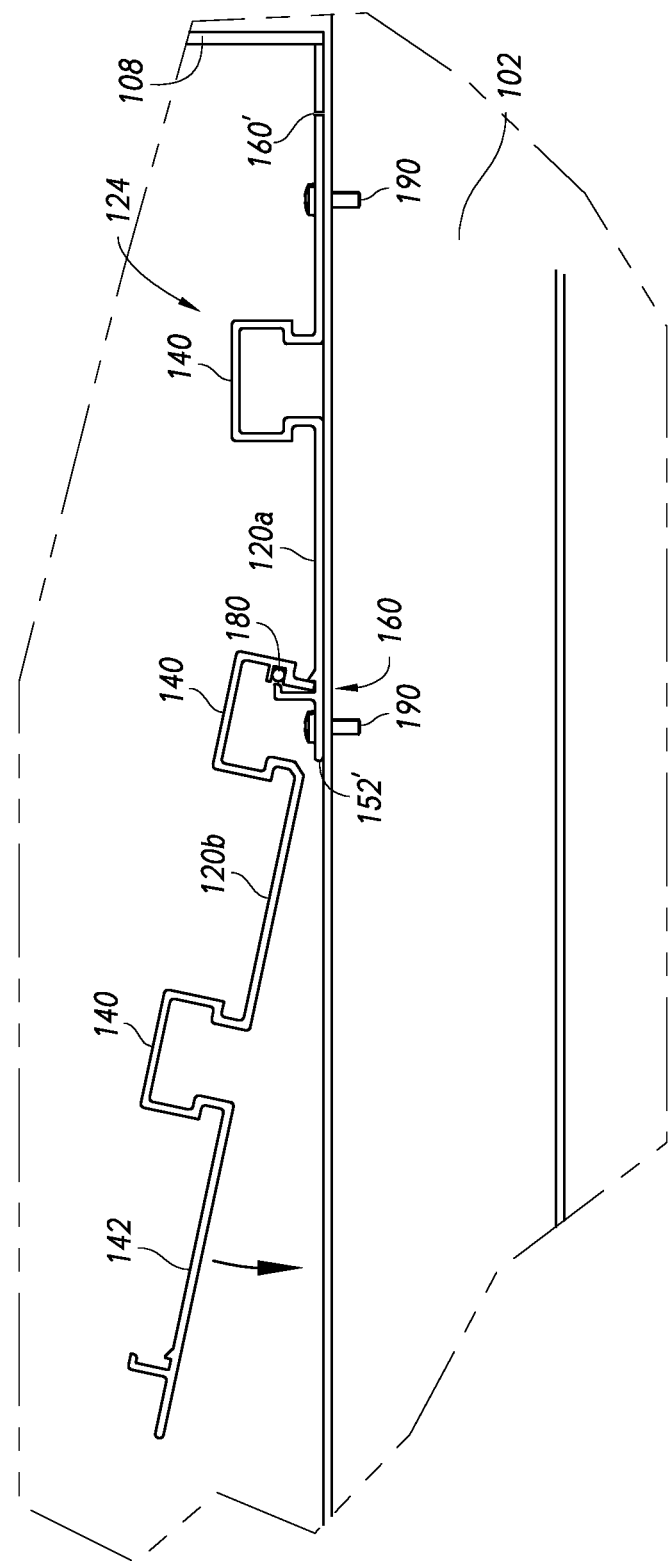
FIG. 9 is an end view of the preferred exemplary second sub-deck section after it has been rotated downward and the interlocking structures between the sub-decks have begun to mate.

FIG. 9 shows the second sub-deck section 120b after it has been rotated downward (e.g. by gravity or manually) and the interlocking structures 170, 172 between the sub-decks beginning to mate. At this point, repositioning may be accomplished by picking up or sliding the second sub-deck section 102b so that it is positioned substantially longitudinally adjacent the first sub-deck section 120a.

Once the second sub-deck section 120b is rotated into place (FIG. 10), the longitudinal guide beam 140 nearest the second longitudinal side edge 152 forms a longitudinal channel (that preferably will be sealed to prevent liquids from entering) over the fasteners 190 of the adjacent first sub-deck section 120b. The fasteners 190 in the sealed longitudinal channel under the longitudinal guide beam 140 are protected from the fluids as well as other damaging substances and actions. In addition, once the second sub-deck section 120b is rotated into place, at least one fastener 190 may be used to attach the at least one extension 174 (and, therefore, the second sub-deck section 120b) to the supporting framework 102.

Figure 10:
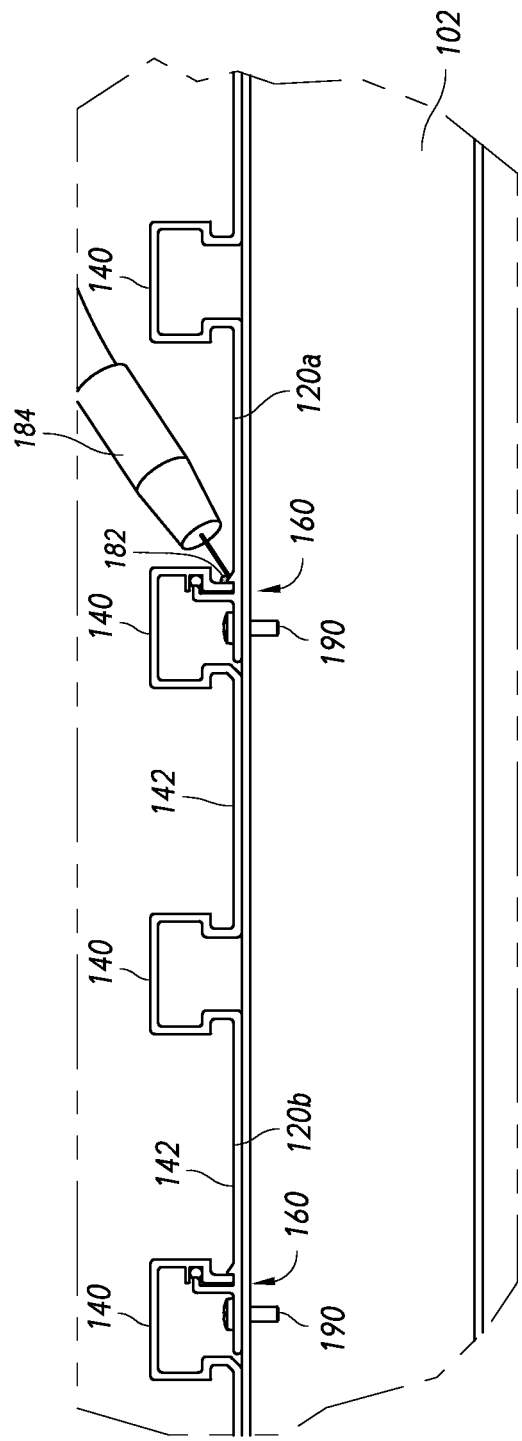
FIG. 10 is a partial end view of preferred exemplary sub-deck sections in mating relationship, and a tool being used to add external sealing structure to the outside of the longitudinal joint.

FIG. 10 shows the second sub-deck section 120b rotated into place (in an orientation similar to the first sub-deck section 120a) after the mating interlocking structures 170, 172 have been fully engaged (thereby creating the rotationally-formed longitudinal liquid-tight sub-deck joint 160). At this point repositioning may be accomplished by sliding the second sub-deck section 102b so that it is positioned substantially longitudinally adjacent the first sub-deck section 120a. The two adjacent sub-deck sections 120, however, are not specifically designed to be longitudinally-slideably related once they are positioned because a tight fit therebetween is preferable. This figure also shows a portion of a third sub-deck section 120c in place (in an orientation similar to the first sub-deck section 120a). It should be noted that in installing the third sub-deck section 120c in relation to the second sub-deck section 120b, the steps would be substantially the same as those used for installing the second sub-deck section 120b in relation to the first sub-deck section 120a.

FIG. 10 also shows additional external sealing structure 182 being applied with a sealing tool 184 longitudinally along the intersection of the longitudinal limiter ridge 176 and the outside of the first longitudinal side edge 150 of the sub-deck section 120. The external sealing structure 182 may be used to seal the outside of the longitudinal joint 160. The type of sealing tool 184 used would depend on the type of external sealing structure 182 being applied. It should be noted that alternative placement of the external sealing structure 182 is possible. For example, the external sealing structure 182 may be positioned between the longitudinal limiter ridge 176 and the second interlocking structure 172 or between the first longitudinal side edge 150 and the second interlocking structure 172. Application of the external sealing structure 182 for these alternatives would be performed prior to the mating of the interlocking structures 170, 172. It should also be noted that the additional external sealing structure 182 is optional.

FIG. 6 shows an enlarged view of an exemplary sub-deck joint 160 formed by the mating interlocking structures 170, 172. In this shown embodiment, the internal sealing structure 180 is shown as creating a seal between the mating interlocking structures 170, 172. This figure also shows the external sealing structure 182 positioned longitudinally along the intersection of the longitudinal limiter ridge 176 and the outside of the first longitudinal side edge 150 of the sub-deck section 120.

After installing the sub-deck, the optional hold-down bearings 132 would be installed on the guide beams 140 and the moving slats 130 would be installed on the bearings 132 and/or the guide beams 140.

Figure 11:
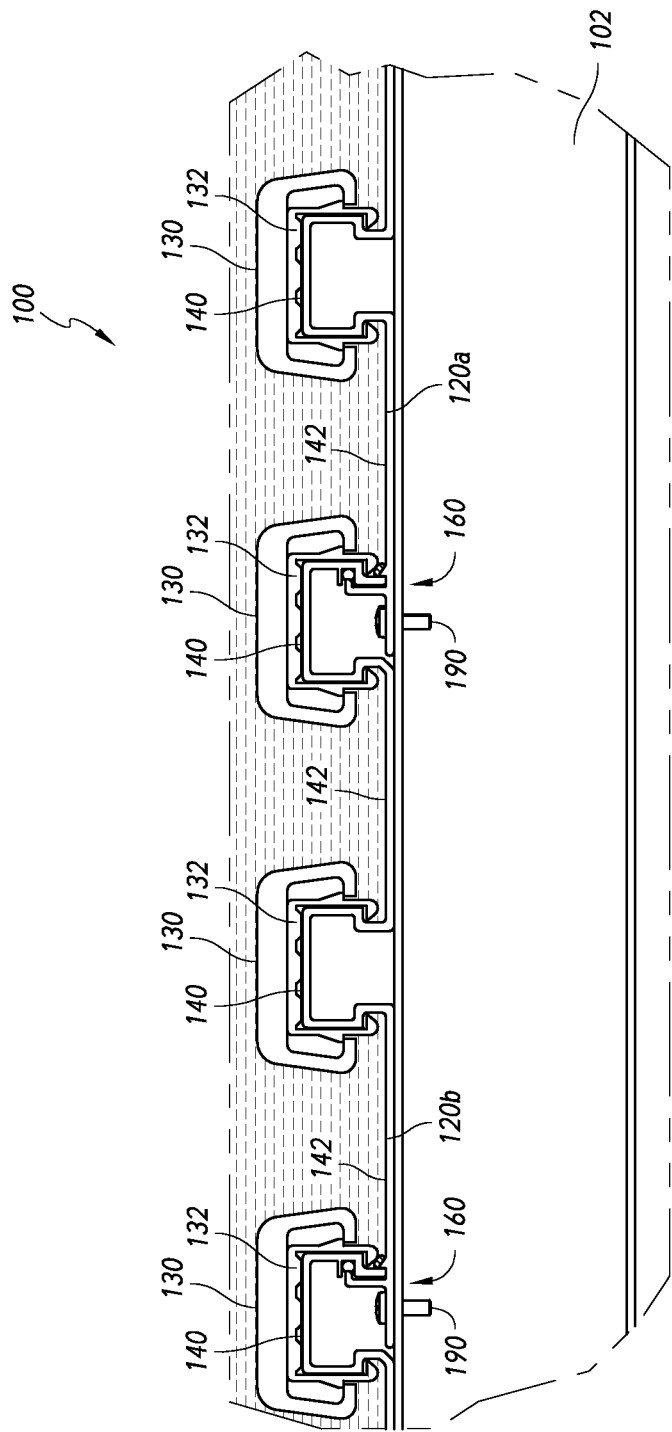
FIG. 11 is a partial end view of liquid being retained above an exemplary liquid-tight reciprocating floor construction or system having sub-deck sections in mating relationship, with exemplary longitudinal slats supported by longitudinal guide beams.

FIG. 11 shows the sub-deck sections 120a and 120b in place after they have been fully engaged using rotationally-formed longitudinal liquid-tight sub-deck joints. In this figure, liquid is being retained above the exemplary liquid-tight reciprocating floor system 100. In some preferred liquid-tight reciprocating floor systems 100, adjacent slats 130 can be separated laterally by a large space. For example, in a liquid-tight reciprocating floor system 100 in which adjacent slats 130 have a latitudinal width of 3.5 inches to 4.0 inches, the slats 130 can be separated laterally by a large space of 2.0 inches to 2.5 inches.

Figure 12:
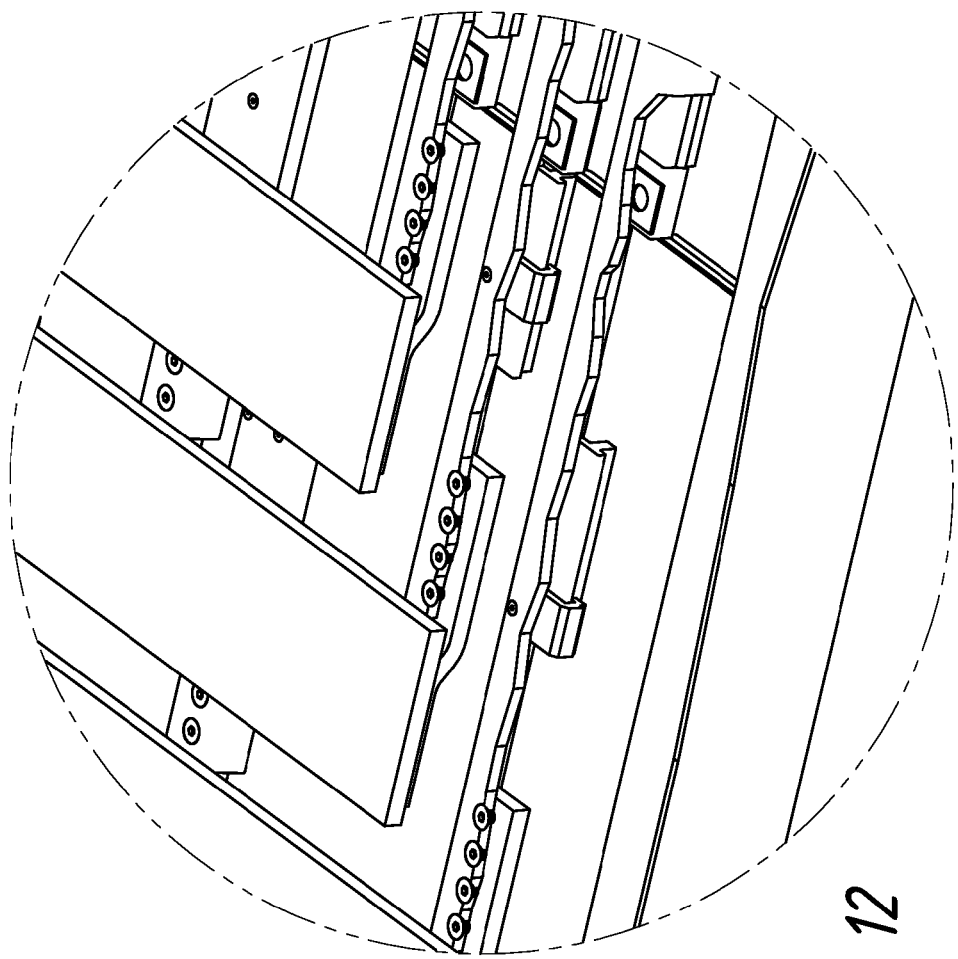
FIG. 12 is a perspective view of an enlarged section of the load-holding compartment of FIG. 2 showing an exemplary attachment structure.

The process of installing may also include attaching the slats 130 to power mechanisms. FIG. 12 shows exemplary attachment structure used for attaching the slats 130 to the power mechanisms that create the reciprocating motion of the slats 130. This figure shows how a front-mounted drive unit may be designed to engage and drive the slats 130. The drive design is similar to the Brute drive and cross-drive sold by Hallco Industries of Tillamook, Oreg., except for the slat-engaging fingers that are similar to the fingers of the cross-drives sold as the TF4500 drive and cross-drive by Hallco Industries and described in the Hallstrom '648 reference. Other arrangements of the slat engaging portion of the cross-drives can be used as well, such as those shown in U.S. Pat. No. 5,222,590 to Quaeck. Additional exemplary attachment structure and power mechanisms are described in the references discussed herein which are herein incorporated by reference in their entirety.

Figure 13:
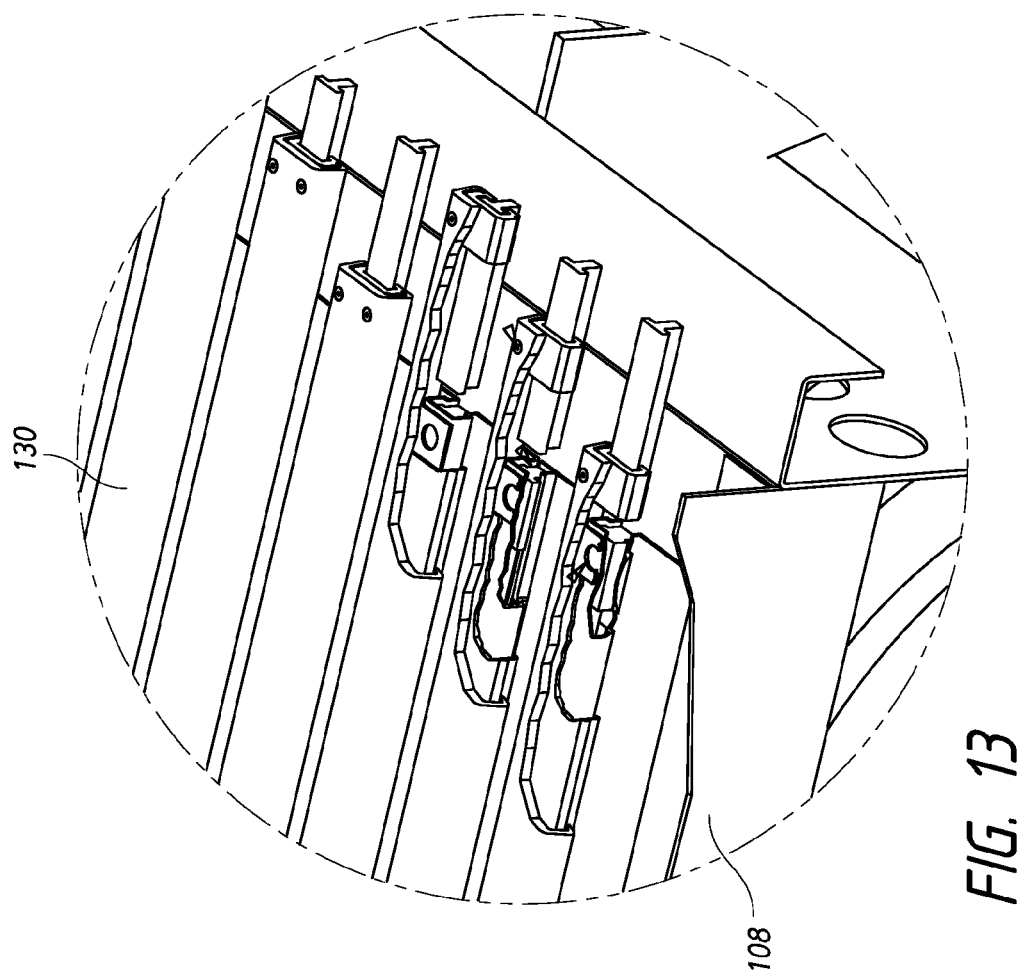
FIG. 13 is a perspective view of an enlarged section of the load-holding compartment of FIG. 2 and particularly exemplary hold-down interlocking components.

FIG. 13 shows that the open ends of each raised longitudinal guide beam 140 of the sub-decks 120 are preferably plugged to prevent liquid leakage. The slat ends are kept from rising by using exemplary hold-down interlocking components such as those shown.

A method that is known in the industry is used to seal the perimeter of the assembly of sub-deck sections 120.

Comparisons and Distinctions

The liquid-tight reciprocating floor system 100 and alternatives thereof described herein have many advantages over the prior art. The following are examples and are not meant to limit the scope of the invention unless and except as specifically claimed.

The installation steps in FIGS. 7-13 have significant advantages over prior art installation methods. For example, handling a 45 foot long heavy sub-deck section 120 is difficult. The liquid-tight reciprocating floor system 100 allows one edge of the sub-deck section 120 being installed (the "new" or second sub-deck section 120b) to be rested on the upper surface of the "installed" or first sub-deck section 120a during the installation process. Thus only one side edge of the long new sub-deck section 120b must be handled without supporting the entire weight of the sub-deck section 120b.

The vertical depression feature (defined between the limiter ridge 176 and the second interlocking structure 172) stops and holds the first longitudinal side edge 150 (e.g. the lower edge of the new sub-deck section 120b) in place as it is positioned. The new sub-deck section 120b can then be rotated down into place. In this way the longitudinal sub-deck joint 160 is self-aligning and can be installed with minimal effort and care. By contrast prior art systems require careful alignment of sub-deck sections 120 as they are joined.

Another advantage over most of the prior art is that, because installation takes place with the adjacent sub-deck sections 120 positioned substantially longitudinally adjacent to each other (a feature that is accomplished because the slats 130 rotate into place), there is no need for the load-holding compartment 104 to be positioned such that there is space beyond the rear end of the load-holding compartment 104 that is substantially as long as the load-holding compartment 104. This is the case, however, if the sub-deck sections 120 are slid into place as is required when the connection between sub-deck sections 120 is a tongue-and-groove connection. For example, in a prior art tongue-and-groove device, if the load-holding compartment 104 is 45 feet long, there would have to be a space of almost 45 feet behind the load-holding compartment 104 to allow each section to be slid into place.

Yet another example of an advantage of preferred systems described herein is that there may be both an exterior longitudinal seal 182 and an interior longitudinal seal 180. Although prior art systems often allow for exterior longitudinal seals 182 to be created using known sealing mechanisms, an interior longitudinal seal 180 is unique in several ways. As discussed above, each sub-deck joint 160 can include a sealing structure retaining groove (first interlocking structure 170) into which internal sealing structure 180 (e.g. an O-ring cord, a rubber cord, and/or caulking) may be inserted. This sealing structure retaining groove makes sealing adjacent sub-deck sections 120 a simple process because the internal sealing structure 180 can be pre-placed in the retaining groove and the actual seal is created when the sub-deck section 120b is rotated into place and the second interlocking structure 172 automatically mates with the first interlocking structure 170. The distance between the optional exterior seal 182 and the interior seal 180 allows the use of a rubber (or other material) with a low melting temperature to be used for the interior seal while at the same time creating the exterior seal 182 by welding.

Creating a uniform seal between two long sub-deck sections 120 in prior art systems is also difficult as there may be warping and twisting in the sub-deck sections 120. The liquid-tight reciprocating floor system 100 and method of installation (including sealing) simplifies this by first engaging the lower edge of the second sub-deck section 120b into the vertical depression feature (between the limiter ridge 176 and the second interlocking structure 172) of the first sub-deck section 120a and aligning the second sub-deck section edge to the depression feature. The following rotating motion further aligns the two sub-deck sections 120 in a process that uses a large mechanical advantage to do so and, thus, reduces the effort involved. By the time the new sub-deck section 120b is at a position that the second interlocking structure 172 (shown as an upright member with protrusion structure or upside down "L" feature) of the installed sub-deck section 120a begins to depress the internal sealing structure 180 in the sealing structure retaining groove (first interlocking structure 170) of the new sub-deck section 120b, the two sub-deck sections 120a, 120b are aligned and very little relative motion takes place other than to depress the internal sealing structure 180. This final sealing motion is consistent throughout the length of the joint 160 without extra care by the installer.

The liquid-tight reciprocating floor system 100 has a dedicated location (e.g. at least one extension 174 that may be a longitudinal extension or several smaller extensions or tabs) to fasten each sub-deck section 120 to the load-holding compartment framework 102. This dedicated location is outside of contact with the waterproof upper surface and, as shown, is within the longitudinal opening or channel under the longitudinal guide beam 140. In other words, the liquid being contained does not come in contact with the heads of the fasteners 190 used. In addition to this, the location to optionally weld the liquid-tight reciprocating floor system joint 160 is along the bottom of the guide beam 140 and, as such, a weld bead doesn't interfere with the bearing 132 or the slat 130.

The Cargo Floor® leakproof floor described by Cargo Floor B.V. Coevorden of Holland in the Assembly Instructions found at www.cargofloor.nl (at least as early as 2006) includes sub-deck pieces that are assembled and joined at a joint between longitudinal side edges of adjacent longitudinal sub-deck sections. Each sub-deck section is shown as having a single valley between two raised edges. The edges are joined together so that the joints are at the top of a slat-support guide beam formed by the two edges of the adjacent longitudinal sub-deck sections. A bearing and slat cover the joint at the top of a slat-support guide beam. As compared to the system described herein, the Cargo Floor® leakproof floor is difficult to install because it requires the second sub-deck section to be positioned carefully in relation to the first sub-deck section. The Cargo Floor® leakproof floor also does not disclose the use of (or a place for) an interior sealing structure. The Cargo Floor® leakproof floor uses fasteners to hold the sub-deck to the container frame that are located outside of the sealed upper surface. Finally, the Cargo Floor® leakproof floor location for placing stitch or seam welds to stiffen the joint does not leave any room for the weld bead. So the weld bead must be ground flush after it is placed. This process requires a lot of labor.

Miscellaneous

It should be noted that the terms "first" and "second" are relational terms used to help in the understanding of the invention. They are not terms of limitation. For example, the "second" sub-deck section becomes the "first" sub-deck section in relation to the sub-deck section that follows it.

It is to be understood that the inventions, examples, and embodiments described herein are not limited to particularly exemplified materials, methods, and/or structures. Further, all publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A liquid-tight sub-deck of a reciprocating slat conveyor positioned in a load-holding compartment, said liquid-tight sub-deck comprising:
   (a) a plurality of longitudinal sub-deck sections, each longitudinal sub-deck section having a first longitudinal side edge and a second longitudinal side edge, each longitudinal sub-deck section comprising at least one longitudinal guide beam and at least one longitudinal valley, at least one longitudinal guide beam having at least one longitudinal sidewall supporting a slat-supporting upper surface in a raised position, an internal surface of said at least one longitudinal sidewall being positioned below said slat-supporting upper surface;
   (b) a first longitudinal side edge of one longitudinal sub-deck section being in a mating relationship with an adjacent second longitudinal side edge of another longitudinal sub-deck section;
   (c) internal sealing structure positioned between adjacent first and second longitudinal side edges to form a longitudinal liquid-tight sub-deck joint therebetween; and
   (d) said first longitudinal side edge having a longitudinal groove along an internal surface of a longitudinal sidewall of a longitudinal guide beam and said second longitudinal side edge having a longitudinal protrusion structure, said longitudinal groove being matable with a longitudinal protrusion of an adjacent longitudinal sub-deck section.

2. The liquid-tight sub-deck of claim 1, said longitudinal liquid-tight sub-deck joints being rotationally-formed longitudinal liquid-tight sub-deck joints between adjacent longitudinal sub-deck sections.

3. The liquid-tight sub-deck of claim 1, said internal sealing structure selected from the group consisting of:
   (a) an O-ring cord seal;
   (b) a rubber cord seal;
   (c) a caulking seal;
   (d) a packing seal; and
   (e) a combination of at least two of (a)-(d).

4. The liquid-tight sub-deck of claim 1, said first longitudinal side edge having a first interlocking structure thereon and said second longitudinal side edge having a second interlocking structure thereon, said first interlocking structure being interlockable with a second interlocking structure of an adjacent longitudinal sub-deck section.

5. The liquid-tight sub-deck of claim 1, said longitudinal groove at least substantially spanning said internal surface.

6. The liquid-tight sub-deck of claim 5, said internal sealing structure positioned between said longitudinal groove and said longitudinal protrusion.

7. The liquid-tight sub-deck of claim 1, said second longitudinal side edge having a second interlocking structure and a motion limiter, a vertical depression feature defined between said second interlocking structure and said motion limiter.

8. The liquid-tight sub-deck of claim 7, said first longitudinal side edge of an adjacent longitudinal sub-deck section positionable within said vertical depression feature, said motion limiter preventing lateral movement of said first longitudinal side edge away from said second interlocking structure.

9. The liquid-tight sub-deck of claim 1, said second longitudinal side edge having a second interlocking structure and an extension, at least one fastener for securing said extension to said load-holding compartment, said at least one fastener positionable in a longitudinal channel under a longitudinal guide beam of an adjacent longitudinal sub-deck section.

10. The liquid-tight sub-deck of claim 9, wherein said longitudinal channel is sealed.

11. The liquid-tight sub-deck of claim 1, said reciprocating slat conveyor further comprising a plurality of moving longitudinal slats, each moving slat-supported on a respective one of said longitudinal guide beams.

12. The liquid-tight sub-deck of claim 1, further comprising a plurality of longitudinal bearings and a plurality of longitudinal slats, each longitudinal bearing positioned on one of said longitudinal guide beams, and each longitudinal slat positioned on one of said longitudinal bearings.

13. A liquid-tight sub-deck of a reciprocating slat conveyor positioned in a load-holding compartment, said liquid-tight sub-deck comprising:
   (a) at least two longitudinal sub-deck sections including a first longitudinal sub-deck section and an adjacent second longitudinal sub-deck section, each longitudinal sub-deck section having a first longitudinal side edge and a second longitudinal side edge, each longitudinal sub-deck section comprising at least one longitudinal guide beam and at least one longitudinal valley;
   (b) a first longitudinal side edge of said first longitudinal sub-deck section having a first interlocking structure associated with an internal surface of a longitudinal sidewall of at least one longitudinal guide beam, said longitudinal sidewall supporting a slat-supporting upper surface in a raised position, said internal surface positioned below said slat-supporting upper surface of said at least one longitudinal guide beam;
   (c) a second longitudinal side edge of said second longitudinal sub-deck section having a second interlocking structure; and
   (d) internal sealing structure positioned between said first interlocking structure and said second interlocking structure when said first interlocking structure and said second interlocking structure are in a mating relationship, said internal sealing structure forming a longitudinal liquid-tight sub-deck joint therebetween.

14. The liquid-tight sub-deck of claim 13, said second longitudinal side edge of said second longitudinal sub-deck section having a motion limiter, a vertical depression feature being defined between said second interlocking structure and said motion limiter, said first longitudinal side edge of said first longitudinal sub-deck section positionable within said vertical depression feature, said motion limiter preventing lateral movement of said first longitudinal side edge away from said second interlocking structure.

15. The liquid-tight sub-deck of claim 13, said second longitudinal side edge of said second longitudinal sub-deck section having an extension beyond said second interlocking structure, at least one fastener for securing said extension to said load-holding compartment, said at least one fastener positionable in a longitudinal channel under a longitudinal guide beam of an adjacent longitudinal sub-deck section.

16. The liquid-tight sub-deck of claim 15, wherein said longitudinal channel is sealed.

17. The liquid-tight sub-deck of claim 13, said longitudinal liquid-tight sub-deck joints being rotationally-formed longitudinal liquid-tight sub-deck joints between adjacent longitudinal sub-deck sections.

18. The liquid-tight sub-deck of claim 13, said reciprocating slat conveyor further comprising a plurality of moving longitudinal slats, each moving slat-supported on a respective one of said longitudinal guide beams.

19. The liquid-tight sub-deck of claim 13, further comprising a plurality of longitudinal bearings and a plurality of longitudinal slats, each longitudinal bearing positioned on one of said longitudinal guide beams, and each longitudinal slat positioned on one of said longitudinal bearings.

20. A liquid-tight sub-deck of a reciprocating slat conveyor positioned in a load-holding compartment, said liquid-tight sub-deck comprising:
(a) at least two longitudinal sub-deck sections including a first longitudinal sub-deck section and an adjacent second longitudinal sub-deck section, each longitudinal sub-deck section having a first longitudinal side edge and a second longitudinal side edge, each longitudinal sub-deck section comprising at least one longitudinal guide beam and at least one longitudinal valley;
(b) a first longitudinal side edge of said first longitudinal sub-deck section having a first interlocking structure at least substantially coextensive with an internal surface of a longitudinal sidewall of a longitudinal guide beam, said longitudinal sidewall supporting a slat-supporting upper surface in a raised position, said internal surface positioned below said slat-supporting upper surface of said longitudinal guide beam;
(c) a second longitudinal side edge of said second longitudinal sub-deck section having a second interlocking structure, a motion limiter, and an extension, a vertical depression feature being defined between said second interlocking structure and said motion limiter;
(d) internal sealing structure positioned between said first interlocking structure and said second interlocking structure when said first interlocking structure and said second interlocking structure are in a mating relationship, said internal sealing structure forming a longitudinal liquid-tight sub-deck joint therebetween;
(e) said first longitudinal side edge of said first longitudinal sub-deck section positionable within said vertical depression feature, said motion limiter preventing lateral movement of said first longitudinal side edge away from said second interlocking structure; and
(f) at least one fastener for securing said extension to said load-holding compartment, said at least one fastener positionable in a longitudinal channel under a longitudinal guide beam of an adjacent longitudinal sub-deck section.

* * * * *